(12) United States Patent
Jordan et al.

(10) Patent No.: US 9,116,848 B1
(45) Date of Patent: Aug. 25, 2015

(54) METHOD OF DETECTING DATA LOSS USING MULTIPLE REFERENCES TO A FILE IN A DEDUPLICATION BACKUP SYSTEM

(75) Inventors: Kevin Elliott Jordan, Vadnais Heights, MN (US); Steven Albert Vranyes, Woodbury, MN (US)

(73) Assignee: Symantec Corporation, Mountain View, CA (US)

( * ) Notice: Subject to any disclaimer, the term of this patent is extended or adjusted under 35 U.S.C. 154(b) by 1119 days.

(21) Appl. No.: 12/503,713

(22) Filed: Jul. 15, 2009

(51) Int. Cl.
*G06Q 99/00* (2006.01)
*G06F 11/14* (2006.01)

(52) U.S. Cl.
CPC .... *G06F 11/1453* (2013.01); *G06F 2212/1032* (2013.01)

(58) Field of Classification Search
CPC ..................... G06F 11/1453; G06F 2212/1032
USPC .............. 707/664, 692; 726/1, 26, 27; 705/50
See application file for complete search history.

(56) References Cited

U.S. PATENT DOCUMENTS

| | | | |
|---|---|---|---|
| 7,840,537 B2 * | 11/2010 | Gokhale et al. | 707/652 |
| 8,250,085 B1 * | 8/2012 | Satish | 707/758 |
| 2004/0163106 A1 * | 8/2004 | Schrempp et al. | 725/31 |
| 2006/0130125 A1 * | 6/2006 | Beiter et al. | 726/4 |
| 2008/0154730 A1 * | 6/2008 | Schmelzer et al. | 705/14 |
| 2008/0243879 A1 * | 10/2008 | Gokhale et al. | 707/100 |
| 2009/0210427 A1 * | 8/2009 | Eidler et al. | 707/10 |
| 2009/0232300 A1 * | 9/2009 | Zucker et al. | 380/2 |
| 2010/0083346 A1 * | 4/2010 | Forman et al. | 726/1 |
| 2010/0250896 A1 * | 9/2010 | Matze | 711/216 |
| 2010/0332454 A1 * | 12/2010 | Prahlad et al. | 707/654 |

OTHER PUBLICATIONS

Forman et al., "Finding similar files in large document repositories", In Proceeding of the Eleventh ACM SIGKDD International Conference on Knowledge Discovery in Data Mining (Chicago, Ill., USA, Aug. 21-24, 2005), KDD '05, ACM, New York, N.Y., 394-400, DOI=http://doi.acm.orgll O. 1145/1081870.1081916, 7 pages.*

* cited by examiner

*Primary Examiner* — James D Nigh
(74) *Attorney, Agent, or Firm* — Lowenstein Sandler, LLP

(57) ABSTRACT

A system and method for improving data loss prevention (DLP) using multiple references to a file in a deduplication backup system is described. In one embodiment, a deduplication backup system generates multiple references to a file. A detection system, operating in the deduplication system or in a data loss prevention (DLP) system coupled to the deduplication system, detects the multiple references, generated by the deduplication system, determines whether the file of at least one of the multiple references is stored outside a domain as specified by a DLP policy, and detects a violation of the DLP policy when the file is stored at a location outside of the specified domain.

19 Claims, 6 Drawing Sheets

METHOD OF DETECTING DATA LOSS USING MULTIPLE REFERENCES TO A FILE IN A DEDUPLICATION BACKUP SYSTEM

FIELD OF INVENTION

Embodiments of the invention relate to the field of data loss prevention, and more particularly, to improving data loss prevention using multiple references to a file in a deduplication backup system.

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Data Loss Prevention (DLP) technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, employees often change their place of employment and may end up moving to a competitor of their former employer. If a new employee possesses knowledge of IP of his or her former employer, this may become a matter of concern for both the former employer and the present employer. For example, if the two competitors are software companies, the former employer has the risk of losing software code developed by a former employee, and the current employer has the risk of being unknowingly liable for IP infringement if the new employee uses the software code developed at the former employer.

Existing security techniques fail to provide efficient solutions that can protect organizations in the situations described above.

SUMMARY OF THE INVENTION

A method and system for improving data loss prevention using multiple references to a file in a deduplication backup system is described. In one embodiment, a deduplication backup system generates multiple references to a file. A detection system, operating in connection with the deduplication system and/or in connection with a data loss prevention (DLP) system coupled to the deduplication system, detects when a file has multiple references and determines whether the file of at least one of the multiple references is stored outside a domain as specified by a DLP policy. The detection system detects a violation of the DLP policy when the file is stored at a location outside of the specified domain.

In one embodiment, a computer-implemented method detects a plurality of references to a file in a deduplication backup system, determines whether the file of at least one of the plurality of references is stored outside a domain as specified by a DLP policy, and detects a violation of the DLP policy when the file is stored at a location outside of the specified domain. In some embodiments, the method creates a report of the violation, which identifies, for each detected incident, at least the location of the stored instance of the particular file that caused the policy violation. In some embodiments the method calculates a file fingerprint for each of a plurality of files scanned during a backup operation performed by the deduplication backup system. The method determines whether each of the plurality of files is unique using the file fingerprints. The method stores a unique copy of each of the plurality of files, each indexed according to the corresponding fingerprint and generates a reference for each of the plurality of files, where each of the references include a pointer to the unique copy in the deduplication backup system and a location of the stored instance of the scanned file. The method determines that the file has more than one reference to the corresponding unique copy. In other embodiment, the method defines the DLP policy to identify the specified domain, and for each of the plurality of references to the file, determines a domain in which an instance of the corresponding file is stored and compares the domain in which the instance of the corresponding file is stored against the specified domain. The method detects the violation when the domains do not match and indicates that the instance of the corresponding file is stored outside the specified domain.

In some embodiments, the method determines whether the file for which the violation is detected includes sensitive data. In some embodiments, the sensitive data includes at least one of personal information pertaining to employees of an organization, personal information pertaining to customers of the organization, information pertaining to business processes of the organization, and information pertaining to intellectual property of the organization. In some embodiments, the method determines whether the file includes sensitive data by comparing objects of the file against DLP fingerprints of protected data that are protected by a DLP policy. In other embodiments, the method determines whether the file includes sensitive data by tagging the file as having sensitive data when the file includes sensitive data. In these embodiments, if the file is tagged, the method creates a report of the violation, which identifies, for each detected incident, at least the location of the stored instance of the particular file that caused the policy violation. If the file is not tagged, the method ignores the violation.

In some embodiments, the method detects the plurality of references by updating a reference count for each reference generated for each of the plurality of files and determines which of the plurality of files have the reference count greater than one. For each of the files having the reference count greater than one, the method determines domains in which instances of the particular file are stored, and compares the domains in which the instance of the particular file is stored against the specified domain. The method detects the violation when the domains do not match, indicating that the one or more instances of the file are stored outside the specified domain.

In one embodiment, a computer readable storage medium provides instructions, which when executed on a processing system, cause the processing system to perform the various embodiments of the methods described herein.

In one embodiment, a system includes a deduplication backup system coupled to an organization network having one or more electronic devices storing a plurality of files, and a detection system to detect a plurality of references to a file in the deduplication backup system. In this embodiment, the deduplication backup system performs a backup operation to scan the plurality of files stored within the organization network, where the backup operation stores a single copy of each of the plurality of files in a deduplication data store even if multiple instances of a particular file are stored in multiple locations, and generates a reference for each of the plurality of files scanned in the backup operation. Each of the references includes a pointer to one of the single copies in the deduplication backup system and a location of the stored instance of the scanned file. In this embodiment, the detection system determines that the file of at least one of the references is stored outside a set of one or more domains as specified by a DLP policy, and detects a violation of the DLP policy when the file is stored at a location outside of the specified set of domains.

In some embodiments, the system further includes a fingerprint manager, coupled to the detection system, to update a reference count for each reference generated for each of the plurality of files. The detection system determines which of the plurality of files have a reference count greater than one, and for each of the files having the reference count greater than one, the detection system determines when the file is stored in the location outside of the specified set of domains to detect the violation of the DLP policy.

In some embodiments, the deduplication system is a hosted deduplication backup system coupled to a plurality of organization networks via a private or public network. In these embodiments, the hosted deduplication system is to perform the backup operation on each of the plurality of organization networks to scan files stored within each of the plurality of organization networks, and the detection system resides in the hosted deduplication backup system to determine which of the scanned files have a reference count greater than one. For each of the scanned files having the reference count greater than one, the detection system determines whether domains, in which instances of the particular file are stored, match the set of one or more domains as specified by the DLP policy.

In other embodiments, the system further includes a hosted DLP system coupled to the hosted deduplication backup system, and the hosted DLP system receives the scanned files that violate the DLP for being stored outside the specified set of domains and determines whether the scanned files includes sensitive data. In some embodiments, the sensitive data includes at least one of personal information pertaining to employees of an organization, personal information pertaining to customers of the organization, information pertaining to business processes of the organization, and information pertaining to intellectual property of the organization.

In other embodiments, the detection system resides in a DLP system coupled to the deduplication backup system. In these embodiments, the detection system receives the plurality of references to the file that is stored in multiple locations, and determines whether the file of at least one of the references is stored outside the specified set of domains to detect the violation of the DLP policy. In some embodiments, the specified set of domains is defined by the DLP policy as being at least one of the following: at least a portion of a domain name of one of the plurality of organization networks; at least a portion of a domain name of a network of one or more devices within one of the plurality of organization networks; a hostname of one or more devices within one of the plurality of organization networks; and one or more network addresses of one of the plurality of organization networks.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
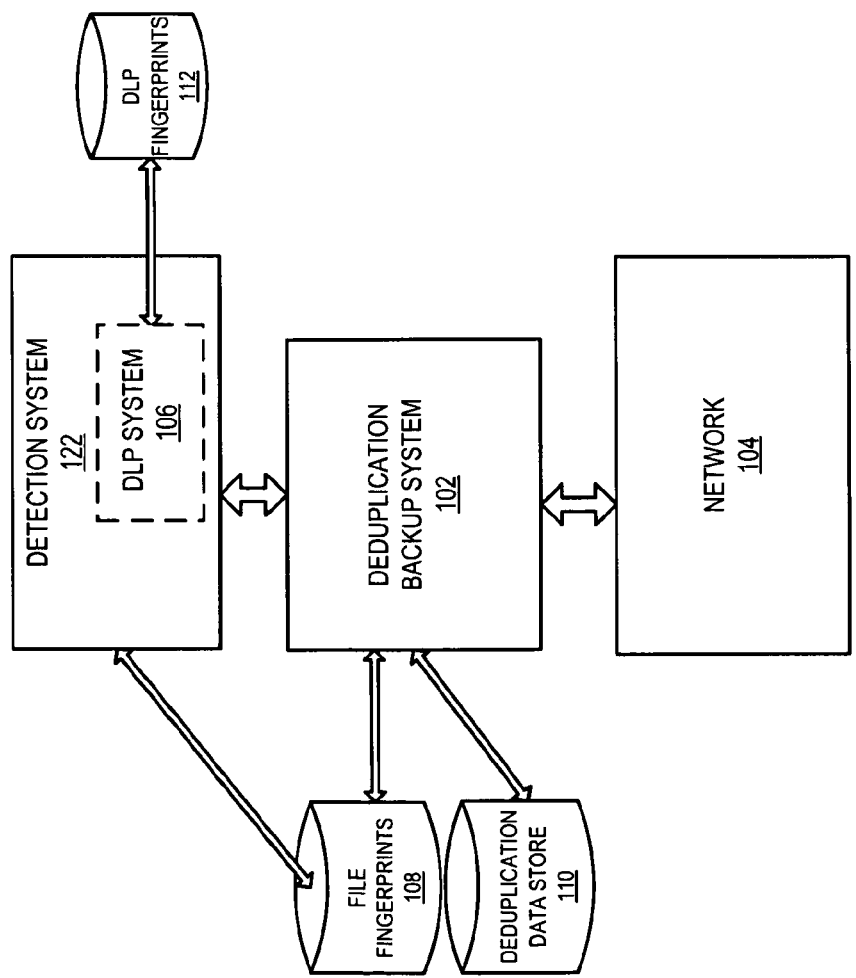
FIG. 1 is a block diagram of exemplary system architecture in which embodiments of the present invention may operate.

A system and method for improving data loss prevention (DLP) using multiple references to a file in a deduplication backup system is described. In one embodiment, a deduplication backup system generates multiple references to a file. A detection system, operating in the deduplication system or in a data loss prevention (DLP) system coupled to the deduplication system, detects the multiple references, generated by the deduplication system, determines whether the file of at least one of the multiple references is stored outside a domain as specified by a DLP policy, and detects a violation of the DLP policy when the file is stored at a location outside of the specified domain. In another embodiment, once the detection system detects the violation, the detection system can determine whether the file contains sensitive data, for example, by comparing information content of the file with DLP fingerprints of sensitive data. Sensitive data may include personal information pertaining to employees of an organization, personal information pertaining to customers of the organization, information pertaining to business processes of the organization, information pertaining to intellectual property (IP) of the organization, etc. The embodiments described herein may be implemented in a deduplication backup system, or alternatively, as part of a DLP system coupled to the deduplication backup system.

In another embodiment, the deduplication backup system may be a hosted backup system that has multiple instances of the deduplication backup system coupled to a backup service provider to provide backup services to multiple networks of various organizations (e.g., enterprises, small businesses, etc.), and detect when files are stored outside of a domain as specified by a DLP policy. In another embodiment, the hosted backup system may be used in conjunction with a hosted DLP system, in which the DLP system of each organization monitors information content associated with this organization to detect sensitive data of other organizations ("external sensitive data"), and notifies a user (e.g., a system administrator) about the detection of the external sensitive data. In addition, the DLP system of each organization sends information regarding the detection of external sensitive data to the DLP service provider. Based on this information, the DLP service provider informs each organization about the detection of their sensitive data at the sites of other organizations.

As a result, the detection system uses the references generated by the deduplication backup system to detect leakage of sensitive data within an organization or within multiple organizations when the sensitive data is stored in files outside of the specified domains, such as, stored in a device in another organization's network (e.g., new employee uses software code developed at his or her former employee).

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of the present invention may operate. System architecture 100 may include a network 104 of an organization (e.g., enterprises, small businesses, etc.). The network 104 of the organization has computers and storage devices coupled to each other via a network (e.g., local area network (LAN)). The computers and the storage devices may store sensitive data of the organization in the form of databases, files, libraries, web pages, etc. The sensitive data may include, for example, confidential employee information, confidential client or patient information, business process information, IP information (e.g., software code, invention disclosure information, etc.), etc.

The network 104 has a deduplication backup system 102 that may be part of the network 104 or be coupled to the network 104. The deduplication backup system 102 may be part of one or more machines including one or more server computers, client computers, gateways or any other computing devices. Deduplication backup systems, also referred to as single-instance storage (SIS) backup systems, are designed to reduce the size of backups, thereby making more efficient use of network resources. A typical networked environment may store many copies of the same file (e.g., document, image, etc.), directory, or other data objects. Although in some embodiments, the deduplication backup system 102 can store copies of any data elements (i.e., elements within a file), the various embodiments described herein are performed at the file level. In these embodiments, the backup system 102 can calculate a file fingerprint (also referred to as a file signature) for each of the files scanned during a backup operation. A file fingerprint includes an encrypted or hashed copy of the source data or some other representation of the source data. The backup system 102 can compare each of the file fingerprints with the file fingerprints of the files already stored in the deduplication data store 110 to determine whether a copy of the scanned file is a duplicate copy or a unique copy. The backup system 102 stores a single copy of each of the scanned files in the network 104 even when multiple instances of the scanned files may be stored at multiple locations within the network 104. For each scanned file, the backup system 102 generates a reference for each of the files, each reference having a location of the stored instance of the particular file in the network 104 and a location of where the single copy is stored in the deduplication data store 110. In one embodiment, the backup system 102 generates an index of the references to determine whether a scanned file is a duplicate copy or a unique copy. By maintaining only "unique" files and references to the files for additional instances of the files, deduplication backup solutions may significantly reduce the storage capacity needed for backups. Although the backup system 102 may use fingerprints of data objects within a file, the backup system 102 is described herein as using file fingerprints to determine whether the scanned file is a duplicate copy or a unique copy. The file fingerprints can be stored in a file fingerprint data store 108.

In the depicted embodiment, the backup system 102 stores unique copies of the files and the references that point to the unique copies in the deduplication data store 110. In the deduplication data store 110, the files may be stored in a compact format where duplicates of the files are eliminated. The deduplication data store 110 may also store metadata for the files that may include an index of references to the files to permit the recovery of eliminated duplicates by following pointers to the "unique" files maintained in the deduplication data store 110. In another embodiment, the metadata may be stored in a metadata repository that is separate from the "unique" files in the deduplication data store 110. The metadata may describe various attributes of the "unique" files such as the ownership affiliations, permissions and security parameters, creation and modification dates, hierarchical relationships, and other suitable attributes of the files. By saving subsequent instances of the file as references in the index, storage capacity needs may be reduced while maintaining the integrity and substantial completeness of the original data store(s). The deduplication backup system 102 may use a variety of techniques to classify data as unique or redundant. In some embodiments, hashing algorithms may be used to identify unique data. In other embodiments, pattern-matching algorithms may be used.

The deduplication backup system 102 may be deployed with a variety of storage technologies such as, for example, disk-based backup appliances or virtual tape library (VTL) solutions that emulate the operations of a tape library. Typically, the backup system 102 builds a catalog of files as the files are copied to the deduplication data store 110. The catalog may index files by assigning or generating a reference to each file. The catalog may be used to recover the duplicate files, if needed. On subsequent backups, the catalog may be used to identify which data objects and/or elements are unique and should therefore be saved in full to the deduplication data store 110.

In the depicted embodiment, the backup system 102 is coupled to a detection system 122 that facilitates detection of DLP policy violations. A DLP policy may trigger a violation if a file is stored outside of a domain. A domain may refer to a location in which the file is stored, such as part of Uniform Resource Locator (URL), network address, file directory, a unique identifier of a device, a subnetwork name or address (e.g., an Internet address prefix and mask), etc. The detection system 122 detects violations of such DLP policies using information generated by the deduplication backup system 102. In one embodiment, the detection system 122 detects multiple references to a file in the deduplication data store 110. Using information in the references, the detection system 122 determines that the file is stored outside the specified domain. In one embodiment, the reference includes information regarding the location at which the file is stored in the network 104, as well as information regarding the location at which the copy is stored in the deduplication data store 110.

In one embodiment, the detection system 122 maintains a data store of file fingerprints, such as the file fingerprint data store 108 or alternatively, as a separate data store. Associated with each file fingerprint is a whitelist of unique domain identifiers. A whitelist is a list that identifies the trusted domains where the file may be stored without triggering a violation of the policy. A file fingerprint uniquely identifies a file. Each identifier in an associated whitelist uniquely identifies a domain. As described above, a domain could be the unique identifier of a specific host computer, or it could be a subnetwork name or address (i.e., an Internet address prefix and mask). The deduplication backup system 102 communicates with the detection system 122 to determine whether any of the files are stored outside a specified domain for detecting a violation of the policy.

In one embodiment, in one form of communication, the deduplication backup system 102 contributes a file fingerprint to the detection system 122 along with a whitelist of domain identifiers. This form of communication is known as fingerprint registration. This communication may identify a new file containing sensitive data, and indicate where that file may legitimately reside. This form of communication may be used during configuration operations of the detection system 122, or when the deduplication backup system 102 is informed that a particular collection of files (e.g., a specific directory of files located on a specific client computer system) is sensitive. In this embodiment, the deduplication backup system 102 enumerates the files in a particular location, calculates their file fingerprints, and contributes those file fingerprints along with a configured domain identifier whitelist to the detection system 122.

In another embodiment, in another form of communication, called fingerprint validation, the deduplication backup system 102 contributes a file fingerprint to the detection system 122 along with a declaration of the domain in which the file fingerprint was produced (i.e., location of the stored instance of the file corresponding to the file fingerprint). This form of communication may occur during normal backup operations. For example, the deduplication backup system 102 can enumerate the files in the file system of a client computer. For each file, the deduplication backup system 102 can calculate a file fingerprint. The deduplication backup system 102 uses this file fingerprint to identify the file in its deduplication backup store 110 and to detect whether it has backed up the file previously, e.g., determines whether a copy of the file has already been stored in the deduplication backup store 110. If it already has a copy, the deduplication backup system 102 increases the reference count on the pre-existing copy. In this embodiment, the deduplication backup system 102 would also contribute the file fingerprint of the file being backed up, along with the identifier of the domain in which the client computer resides, to the detection system 122. The detection system 122 would look up the file fingerprint in its file fingerprint data store, which may be a separate data store or the same data store as the file fingerprint data store 108. If it finds a match, the detection system 122 increases the reference count on the recorded fingerprint, and records the client computer's domain identifier in association with the file fingerprint. The detection system 122 compares the client computer's domain identifier to each of the domain identifiers of the whitelist associated with the recorded fingerprint, and if no match is found, it would detect a domain residence violation (referred to herein as a violation of the DLP policy). If the file fingerprint, contributed by a backup system during a normal backup operation, does not match a file fingerprint recorded in the detection system's file fingerprint store, the detection system 122 may add the file fingerprint to its file fingerprint data store along with an indication that the file fingerprint is not yet known to identify sensitive data. Alternatively, the detection system 122 may store this indication in the file fingerprint data store 108. This may be done so that, if in future, the deduplication backup system 102 performs a fingerprint registration operation, where the contributed file fingerprint was previously recorded during a normal backup, the detection system 122 can evaluate whether the previously recorded fingerprint originated from a legitimate domain.

Although FIG. 1 illustrates the detection system 122 being coupled to one deduplication backup system 102, in other embodiments, the detection system 122 is coupled to multiple deduplication backup systems. Also, although FIG. 1 illustrates the detection system 122 being coupled to the deduplication backup system 102, in other embodiments, the detection system 122 resides in the deduplication backup system 122, or in a DLP system (as described below). Alternatively, other configurations may be used to implement the operations of the detection system 122 as would be appreciated by one of ordinary skill in the art having the benefit of this disclosure.

In one embodiment, the operations of the detection system 122 are implemented as an in-line process during normal backup operations. For example, the operations of the detection system 122 may be performed concurrently or simultaneously with the backup operations of the deduplication backup system 102. Alternatively, the operations of the detection need not be executed as an in-line process during normal backup operation, but could also be executed as periodic operations or scheduled operations. For example, in one embodiment, a detection system 122 deploys a detection agent to execute on a device, such as a backup server in which the deduplication backup system 102 resides, and the detection agent could periodically enumerate file fingerprints recorded in the backup system's file fingerprint data store 108. The deduplication backup system 102 records the backup client domain associated with each file fingerprint in its file fingerprint data store 108, and the detection agent can present each of the backup system's file fingerprints along with the associated client domain to the detection system 122 in a validation request. The detection system 122 receives the validation request to determine whether the file corresponding to the file fingerprint is stored outside a trusted domain to detect a violation of the DLP policy.

It should be noted that in the embodiment of the detection system 122 being coupled to multiple deduplication backup systems, the detection system 122 may have a file fingerprint store containing the union of file fingerprints found in all of the backup system's file fingerprint data stores (e.g., 108). The file fingerprint data store of the detection system 122 may be separate and independent of the backup system file fingerprint stores. In another embodiment, the file fingerprint data store of the detection system 122 may also be shared with one of file fingerprint data stores for each deduplication backup system 122 to conserve storage.

Even if a file is stored outside of a specific domain, a DLP policy may not trigger a violation unless the file also contains sensitive data. In particular, a DLP policy may specify conditions that trigger a violation based on regulations concerning handling of sensitive data maintained by an organization, or based on corporate data governance rules. These regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, or the like. The detection system 122 could, but need not, be enhanced further by integrating with the DLP system 106. The rules defined by the DLP system 106 could be used in refining the fingerprint registration process. For example, instead of registering the file fingerprints of all files on a particular client system, or all files within a directory of that system, the rules of a DLP system could be used in filtering the files such that only those files matching DLP rules would be registered in the detection system's file fingerprint store (e.g., file fingerprint data store 108). In another embodiment, the detection system 122 first determines whether a file is stored outside of a specific domain, and if so, the detection system 122 further determines whether the file contains sensitive data (e.g., using the DLP system 106).

In another embodiment, the files are tagged as containing sensitive data before the backup operation, and the detection system 122 creates a report of the violation when the file is tagged as containing sensitive data, and ignores the violation when the file is not tagged. In another embodiment, the files may be tagged as containing sensitive data as part of the backup operation, such as the first time the backup operation is performed, and the tagged files can be used in subsequent backup operations to speed up detection of violations of files that contain sensitive data.

If the detection system 122 detects that the file is stored outside the specified domain and contains sensitive data, the detection system 122 creates a report of the violation. The report may identify the location of the stored instance of the particular file that caused the policy violation for each detected incident. If the detection system 122 detects that the file is stored outside the specified domain, but does not contain sensitive data, the detection system 122 may either generate a report to indicate that a file is stored outside the specified domain, or ignore the violation since the file does not contain sensitive data. These conditions may be defined in the DLP policy.

In the depicted embodiment, the DLP system 106 is integrated in the detection system 122. In other embodiments, the DLP system 106 may be separate from the detection system 122, and the detection system 122 may communicate with the DLP system 106 to determine whether the file(s) stored outside of the specified domain(s) contain sensitive data protected by the DLP system 106. For example, the detection system 122 can send the file that has been detected as being stored outside the specified domain to the DLP system and the DLP system scans the file to detect sensitive data that violates DLP policies. For example, the file may contain source data containing sensitive data that is protected by DLP policies. The DLP system 106 may be part of one or more machines including one or more server computers, client computers, gateways or any other computing devices. The DLP system 106 may also be configured to scan information within the organization network 104 (e.g., on client devices within the network 104 and/or centralized repositories within the network 104) and electronic communications transferred from, and to, the organization network 104 to detect sensitive data that violates DLP policies.

The DLP system 106 performs the scanning using DLP fingerprints of source data containing sensitive data. A DLP fingerprint includes an encrypted or hashed copy of the source data or some other representation of the source data that uniquely identifies the source data. In one embodiment, a DLP fingerprint would not allow a malicious user to recover the actual content of the source data. The DLP system 106 may create DLP fingerprints from sensitive data stored within the organization and store it in a data store (e.g., a database, a repository, etc.), labeled in FIG. 1 as DLP fingerprint data store 112.

When scanning information content stored within the network 104 and/or information content sent and/or received by the network 104, the DLP system 106 may determine that the information content includes sensitive data that violates a DLP policy. The DLP system 106 may then report the policy violation to a designated user (e.g., a system administrator, a supervisor of the sender or recipient, etc.), prevent the transfer of the information content violating the DLP policy, or perform some other action.

In an alternative embodiment, the detection system 122 is implemented within the DLP system 106 to detect a DLP violation when a file is stored outside of a domain as specified by a DLP policy using information generated by the deduplication backup system 102. Depending on a relevant DLP policy, the detection system 122 may also need to match a relevant file fingerprint against DLP fingerprints to detect a DLP policy violation.

Figure 2:
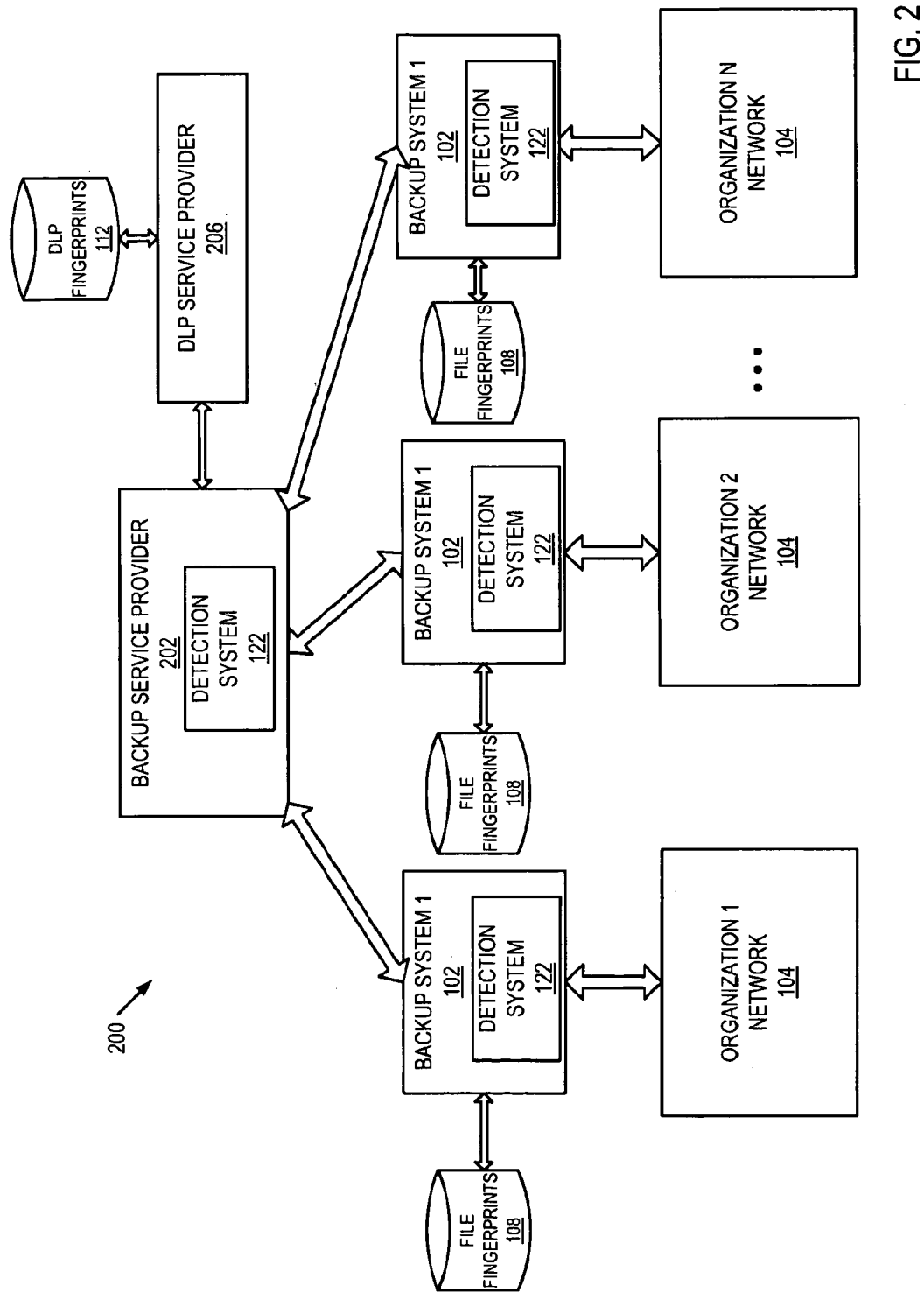
FIG. 2 is a block diagram of another exemplary system architecture in which embodiments of the present invention may operate.

FIG. 2 is a block diagram of another exemplary system architecture 200 in which embodiments of the present invention may operate. System architecture 200 may include networks 104 of various organizations (e.g., enterprises, small businesses, etc.). Each organization has computers and storage devices coupled to each other via a network (e.g., local area network (LAN)). The computers and the storage devices may store sensitive data of the organization in the form of databases, files, libraries, web pages, etc. The sensitive data may include, for example, confidential employee information, confidential client or patient information, business process information, IP information (e.g., software code, invention disclosure information, etc.), etc.

Each network 104 has an instance of the deduplication backup system 102 that may be part of the network 104 or be coupled to the network 104. The backup system 102 may be hosted by one or more machines including one or more server computers, client computers, gateways or other computing devices. The backup systems 102 are coupled to a backup services provider 202 via a network (e.g., a public network such as Internet or a private network such as LAN). The backup service provider 202 may include one or more servers or other computing devices communicating with the backup systems 102 as will be discussed in more detail below. The backup service provider 202 may also communicate with a hosted DLP service provider 206. The hosted DLP service provider 206 may also have multiple instances of a DLP system (not illustrated in FIG. 2) on each of the networks 104 that communicate with the DLP service provider 206 over a public or private network. The backup service provider 202 may be part of one or more machines including one or more server computers, client computers, gateways or other computing devices.

In the depicted embodiment, the detection system 122 is illustrated as being part of each of the deduplication backup system 102 or as part of the backup service provider 202. As described above, the detection system 122 may be separate from the deduplication backup system 102. Similarly, the detection system 122 may be separate from the backup service provider 202 and be coupled to communicate with the backup service provider 202 to detect whether a file is stored outside a specified domain. For example, during the backup operation of a first organization network 104 (organization 1), the detection system 122 may detect a file that has a second organization network 104 (organization 2) as the specified domain. Since the specified domain does not include the first organization network, the detection system 122 detects a violation of the DLP policy because the file is stored at a location (organization 1) outside the specified domain (organization 2).

Figure 3:
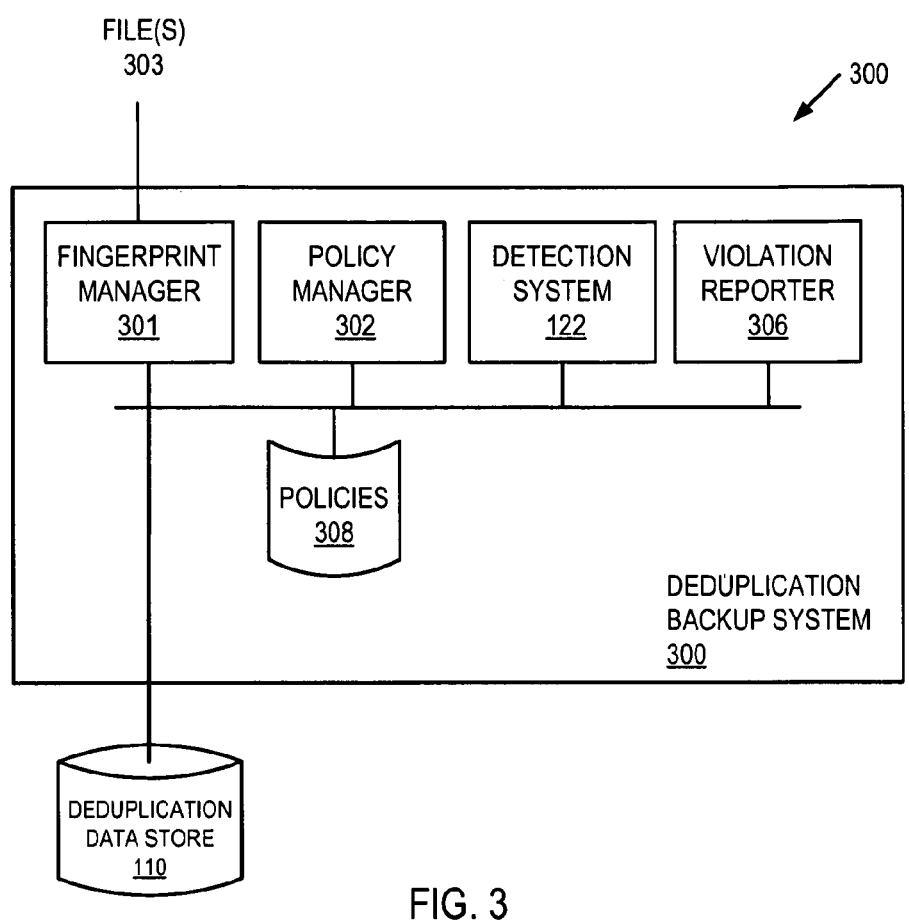
FIG. 3 is a block diagram of one embodiment of a deduplication backup system.

FIG. 3 is a block diagram of one embodiment of a deduplication backup system 300. The deduplication backup system 300 may include a fingerprint manager 301, a policy manager 302, a detection system 122, a violation reporter 306, and a policy data store 308.

The fingerprint manager 301 calculates a file fingerprint for each file 303 scanned during a backup operation performed by the deduplication backup system 300. Using the file fingerprints, the fingerprint manager 301 determines whether each of the files 303 is unique. The fingerprint manager 301 stores a single copy of each of the unique files 303 in the deduplication data store 110, indexed according to the file fingerprints. The fingerprint manager 301 stores a single copy for a given file even if multiple instances of the given file are stored in multiple locations. The fingerprint manager 301 generates a reference for each of the scanned files 303, each reference containing a pointer to one of the single copies stored in the deduplication data store 110 and a location of the stored instance of the file 303. In one embodiment, the fingerprint manager 301 maintains a reference count for each of the file fingerprints. If the reference count is one, there is only one instance of the file. If the reference count is greater than one, more than one instance of the file is stored in multiple locations.

The policy manager 302 defines DLP policies and stores them in the policy store 308. A policy may require monitoring for files stored outside of a specified set of domains to protect against data loss incidents. For example, the set of domains may be at least one of the following: a domain name or a portion of the domain name corresponding to one or more of the organization networks 104; a domain name or a portion of the domain name of a network of one or more devices within one of the organization networks 104; a hostname of one or more devices within one of the organization networks; and one or more network addresses (e.g., IP address or range of IP addresses) of one or more of the plurality of organization networks. In other embodiments, the specified set of domains may refer to other locations of an organization network, or locations within the organization network. For example, the set of domain names may specify a domain name (e.g., widgets.com) of a first entity and a DLP policy is triggered when a duplicate copy (a second reference to a unique file within the domain) is stored at a location outside of the domain name of the first entity, such as a domain name (e.g., fasterwidgets.com) of a second entity. In another example, the set of domains names may specify a hostname of a client device within an organization network 104, such as the client device used by a first person (e.g., president) of an entity, and a DLP policy is triggered when a duplicate copy is stored at a location outside of the hostname of the first person, such as a hostname of a second person (e.g., an engineer) of the same entity or of a different entity.

In one embodiment, in addition to trusted and/or untrusted domains, a DLP policy also specifies sensitive data that should trigger a DLP policy violation if detected in the file.

The policy manager 302 may create DLP policies based on user input. Alternatively, the policy manager 302 may receive DLP policies from the DLP service provider 206 and store them in the policy store 308.

The detection system 122 detects multiple references to a file stored in the deduplication data store 110. The detection system 122 may be notified by the fingerprint manager 301 when a particular file has more than one reference, i.e., the reference count for the particular file is greater than one. Alternatively, the detection system 122 can analyze the index generated by the fingerprint manager 301 to determine which files have a reference count greater than one. The detection system 122 determines whether the file having the multiple references is stored outside of the set of domains as specified by the DLP policy and detects a violation of the DLP policy when the file is stored at a location outside of the specified set of domains. If the violation is detected, the detection system 122 invokes the violation reporter 306 that performs a predetermined action such as reporting the violation, or the like.

In one embodiment, the fingerprint manager 301 updates a reference count for each reference generated for each of the files, and the detection system 122 determines which of the files have a reference count greater than one. For each of the files having the reference count greater than one, the detection system 122 determines when the file is stored in the location outside of the specified set of domains to detect the violation of the DLP policy.

In another embodiment, the detection system 122, upon detecting that a file is stored outside the specified domain, determines whether the file contains sensitive data. The detection system 122 can scan information content of the file using DLP fingerprints (e.g., stored in DLP fingerprint data store 112) or it can compare the file fingerprint with DLP fingerprints. Upon detecting a match, the detection system 122 determines whether this match violates a DLP policy. If so, the detection system 122 invokes the violation reporter 306 that performs a predetermined action such as reporting the violation, or the like. If the policy being violated concerns data that is stored external to the organization network, the violation reporter 306 notifies a system administrator, for example, about the policy violation incident, and sends information on the policy violation incident to the DLP service provider 206. The information sent to the DLP service provider may identify, for example, the DLP policy being violated, the customer ID associated with the detected sensitive data, the detected sensitive data, one or more parties that caused the violation, etc.

In another embodiment, the detection system 122, upon detecting that a file is stored outside the specified domain, sends the file to a DLP system coupled to the deduplication backup system 300 (not illustrated in FIG. 3) to determine whether the file contains sensitive data.

It should be noted that the deduplication backup system 300 may include other components for performing a backup operation. Details regarding these other components have not been included so as to not obscure the description of the present embodiments.

Figure 4:
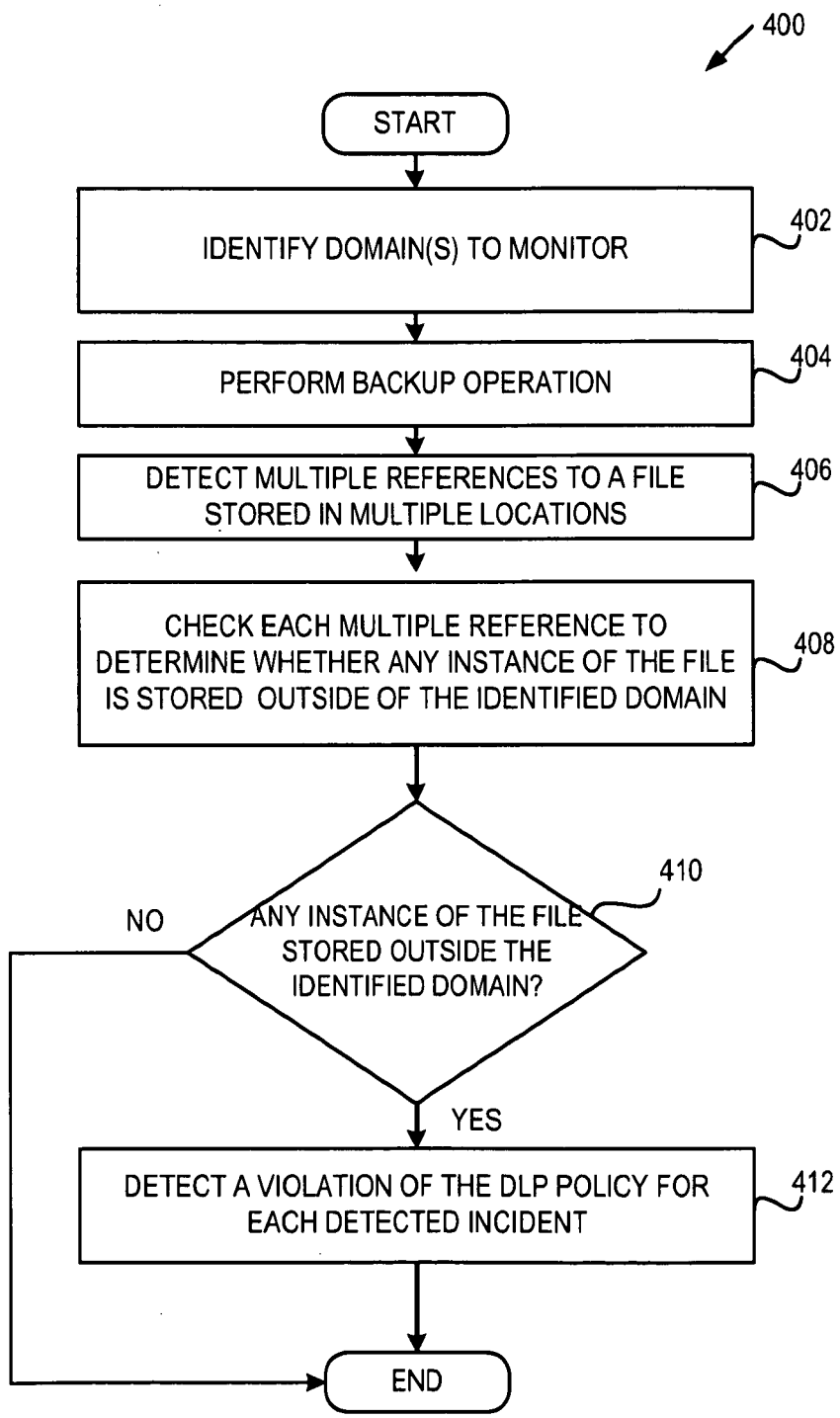
FIG. 4 is a flow diagram of one embodiment of a method using multiple references to a file to detect a DLP violation.

FIG. 4 is a flow diagram of one embodiment of a method using multiple references to a file to detect a DLP violation. The method 400 is performed by processing logic that may comprise hardware (circuitry, dedicated logic, etc.), software (such as is run on a general purpose computer system or a dedicated machine), firmware (embedded software), or any combination thereof. In one embodiment, the method 400 is performed by the detection system 122 in connection with the deduplication backup system 102 and/or the DLP system 106 and/or the backup service provider 202 or the DLP service provider 206.

Referring to FIG. 4, processing logic begins with identifying a set of one or more domains to monitor for DLP violations using the deduplication backup system (block 402). Processing logic performs a backup operation (block 404). Alternatively, the processing logic can identify the set of domains after the backup operation has been performed. Processing logic detects multiple references to a file (e.g., multiple instances of the same file stored at different locations) (block 406). The processing logic checks each multiple reference to determine whether any instance of the file is stored outside of the identified domain (block 408). At block 410, processing logic determine if any instance of the file is stored outside the identified domain. If any of the instances are stored outside of the domain, processing logic detects a violation of the DLP policy for each detected incident (block 412). If no violation is detected, the method 400 ends.

Figure 5:
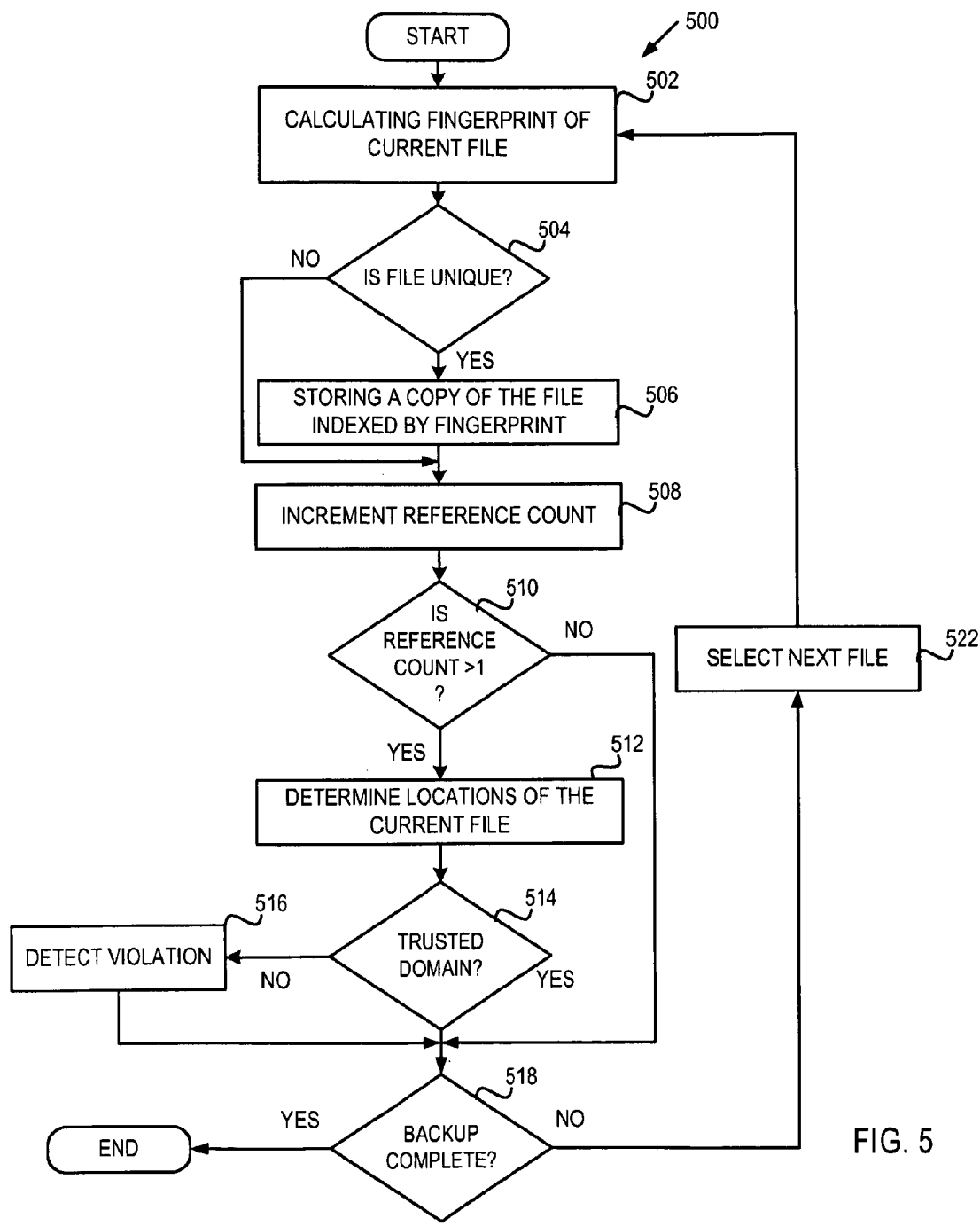
FIG. 5 is a flow diagram of one embodiment of a method of performing a backup operation to detect DLP policy violations.

FIG. 5 is a flow diagram of one embodiment of a method of performing a backup operation to detect DLP policy violations. The method 500 is performed by processing logic that may comprise hardware (circuitry, dedicated logic, etc.), software (such as is run on a general purpose computer system or a dedicated machine), firmware (embedded software), or any combination thereof. In one embodiment, the method 500 is performed by the detection system 122 in connection with the deduplication backup system 102 and/or the backup service provider 202.

Referring to FIG. 5, processing logic begins with calculating a file fingerprint for a current file being scanned in the backup operation (block 502). Using the file fingerprint, processing logic determines whether the file is unique (block 504). If the file is unique, processing logic stores a copy of the file and indexes the file by the file fingerprint (block 506) and increments a reference count of the file (block 508). If the file is not unique, the processing logic increments the reference count of the file (block 508) without storing a duplicate copy of the file. The processing logic generates a reference for each instance of the file, whether the instance is a first instance of the file (unique file) or a subsequent instance of the file (duplicate file). At block 510, processing logic determines whether the reference count for the file is greater than one. If the reference count is greater than one, processing logic determines the locations of the instances of the current file (block 512), and determines whether the locations are within the specified set of domains (i.e., within a trusted domain) (block 514). If the location is not within the trusted domain, processing logic detects a violation of the DLP policy (block 514). Although in the depicted embodiment, if the reference count is not greater than one at block 510, the processing logic does not determine the locations of the current file or determine whether the locations are within the trusted domain, in other embodiments, even a single instance of a file can be checked to see if it is stored within a trusted domain at block 514. At block 518, processing logic determines whether the backup operation is completed. If the backup operation is not complete, processing logic selects the next file as the current file at returns to block 502. Otherwise, the method 500 ends.

It should be noted that the various operations of FIG. 5 are performed as part of a backup operation, whereas various operations of FIG. 4 may be performed after the backup operation at block 404 has been performed. For example, in the embodiment of FIG. 5, the method calculates file fingerprints, determines if the file is unique, stores the unique files, and increments the reference counts. In one embodiment, some or all of the operations of method 500 may be performed as part of block 404 of the method 400. Also, as described above, the embodiments described herein may be implemented as an in-line process with the backup operation, or alternatively, as periodic or scheduled operations after the backup operation has been performed.

Figure 6:
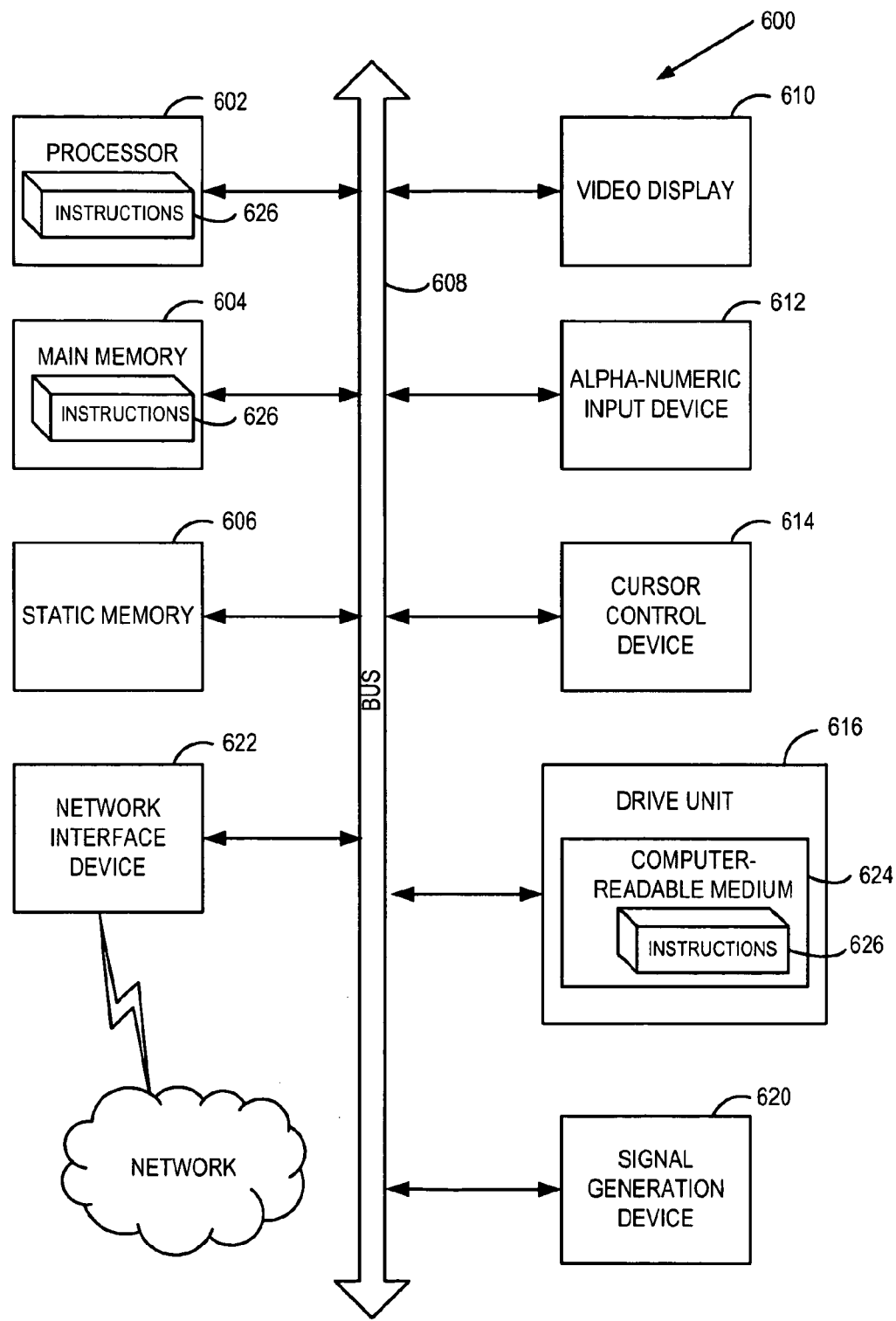
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for determining whether files are stored outside specified domains as specified by a DLP policy and for detecting a violation of the DLP policy when the files are stored at locations outside of the specified domains.

The exemplary computer system 600 includes a processing device (processor) 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 616, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions (e.g., software 626) embodying any one or more of the methodologies or functions described herein. The software 626 may also reside, completely or at least partially, within the main memory 604 and/or within the processor 602 during execution thereof by the computer system 600, the main memory 604 and the processor 602 also constituting computer-readable storage media. The software 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method, comprising:
receiving, by a processing device, a plurality of references associated with a file from a deduplication backup system storing a backup copy of the file, the plurality of references indicating location information of a plurality of instances of the file that are stored at different locations on a network;
determining, in view of the plurality of references, whether at least one instance of the plurality of instances of the file is stored outside a storage domain specified by a policy; and
detecting a violation of the policy if the plurality of references indicate that the at least one instance of the plurality of instances of the file is stored outside of the specified storage domain.

2. The method of claim 1, wherein said detecting the violation of the policy comprises creating a report of the violation, wherein the report identifies, for each detected incident, at least a location of an instance of the plurality of instances of the file that caused the policy violation.

3. The method of claim 1, further comprising:
calculating a file fingerprint for each of a plurality of files scanned during the backup operation performed by the deduplication backup system;
using the file fingerprints, determining whether each of the plurality of files is unique;
storing a unique copy of each of the plurality of files, each indexed according to the corresponding file fingerprint;
generating a reference for each instance of each file of the plurality of files, wherein the reference comprises a pointer to the unique copy in the deduplication backup system and a location of the stored instance of the scanned file; and
determining that the file has more than one reference to the corresponding unique copy.

4. The method of claim 1, wherein determining whether at least one instance of the plurality of instances of the file is stored outside the storage domain comprises:
defining the policy to identify the specified domain; and
for each of the plurality of references to the file,
determining a domain in which an instance of the file is stored, and
comparing the domain in which the instance of the file is stored against the specified domain, wherein detecting the violation of the policy comprises detecting the violation when the domains do not match, and indicating that the instance of the file is stored outside the specified domain.

5. The method of claim 1, further comprising determining whether the file for which the violation is detected comprises sensitive data.

6. The method of claim 5, wherein the sensitive data comprises at least one of personal information pertaining to employees of an organization, personal information pertaining to customers of the organization, information pertaining to business processes of the organization, and information pertaining to intellectual property of the organization.

7. The method of claim 5, wherein determining whether the file comprises sensitive data comprises comparing objects of the file against DLP fingerprints of protected data that are protected by a DLP policy.

8. The method of claim 5, further comprising tagging the file as having sensitive data when the file comprises sensitive data, and wherein detecting the violation of the policy further comprises:
if the file is tagged, creating a report of the violation, wherein the report identifies, for each detected incident, at least a location of the instance of the file that caused the policy violation; and
if the file is not tagged, ignoring the violation.

9. The method of claim 3, further comprising:
updating a reference count for each reference generated for the each of the plurality of files; and
determining which of the plurality of files have the reference count greater than one;
for each of the files having the reference count greater than one,
determining domains in which instances of the particular file are stored, and
comparing the domains in which the instance of the particular file is stored against the specified domain, wherein detecting the violation of the policy comprises detecting one or more violations when the domains do not match, indicating that the one or more of the plurality of instances of the file are stored outside the specified domain.

10. A computing system, comprising:
a deduplication backup system comprising one or more computing devices coupled to an organization network having one or more electronic devices storing a plurality of files, the deduplication backup system to:
perform a backup operation to scan a file of the plurality of files stored within the organization network, wherein the backup operation stores a backup copy of a the file in a deduplication data store, and generate a plurality of references associated with the file indicating location information of a plurality of instances of the file that are stored at different locations on the network; and a detection system comprising one or more computing devices coupled to the deduplication backup system, the detection system to:

receive, from the deduplication backup system, the plurality of references associated with the file, determine, in view of the plurality of references, whether at least one instance of the plurality of instances of the file is stored outside a storage domain specified by a policy, and detect a violation of the policy if the plurality of references indicate that at least one instance of the plurality of instances of the file is stored outside of the specified storage domain.

11. The system of claim 10, wherein the detection system is further configured to:

update a reference count for each reference generated for the file;

determine if the reference count is greater than one; and if the reference count greater than one, determine when the file is stored in a domain outside of the storage domain specified by the policy to detect the violation of the policy.

12. The system of claim 10, wherein the deduplication system is a hosted deduplication backup system coupled to a plurality of organization networks via a private or public network, wherein the hosted deduplication system is to perform the backup operation on each of the plurality of organization networks to scan files stored within each of the plurality of organization networks, wherein the detection system resides in the hosted deduplication backup system to determine which of the scanned files have a reference count greater than one, and for each of the scanned files having the reference count greater than one, determining whether domains, in which instances of the particular file are stored, match the storage domain as specified by the policy.

13. The system of claim 12, wherein the detection system receives the scanned files that violate the policy for being stored outside the specified storage domain and determines whether the scanned files comprises sensitive data.

14. The system of claim 10, wherein the specified storage domain is defined by the policy as being at least one of the following:

at least a portion of a domain name of one of the plurality of organization networks;

at least a portion of a domain name of a network of one or more devices within one of the plurality of organization networks;

a hostname of one or more devices within one of the plurality of organization networks; and one or more network addresses of one of the plurality of organization networks.

15. The system of claim 13, wherein the sensitive data comprises at least one of personal information pertaining to employees of an organization, personal information pertaining to customers of the organization, information pertaining to business processes of the organization, and information pertaining to intellectual property of the organization.

16. A non-transitory computer readable storage medium that provides instructions, which when executed on a processing device, cause the processing device to perform a method comprising:

receiving, by the processing device, a plurality of references associated with a file from a deduplication backup system storing a backup copy of a file, the plurality of references indicating location information of a plurality of instances of the file that are stored at different locations on a network;

determining, in view of the plurality of references, whether at least one instance of the plurality of instances of the file is stored outside a storage domain specified by a policy; and detecting the violation of the policy if the plurality of references indicate that at least one instance of the plurality of instances of the file is stored outside of the specified storage domain.

17. The computer readable storage medium of claim 16, further comprising:

calculating a file fingerprint for each of a plurality of files scanned during the backup operation performed by the deduplication backup system;

using the file fingerprints, determining whether each of the plurality of files is unique;

storing a unique copy of each of the plurality of files, each indexed according to the corresponding file fingerprint;

generating a reference for each instance of each file of the plurality of files, wherein the reference comprises a pointer to the unique copy in the deduplication backup system and a location of the instance of the scanned file; and determining that the file has more than one reference to the corresponding unique copy.

18. The computer readable storage medium of claim 16, wherein determining whether at least one instance of the plurality of instances of the file is stored outside the specified storage domain comprises:

defining the policy to identify the specified storage domain; and for each of the plurality of references to the file, determining a domain in which an instance of the file is stored, and comparing the domain in which the instance of the file is stored against the specified domain, wherein detecting the violation of the policy comprises detecting the violation when the domains do not match, and indicating that the instance of the file is stored outside the specified storage domain.

19. The computer readable storage medium of claim 16, further comprising determining whether the file for which the violation was detected comprises sensitive data, the sensitive data comprising at least one of personal information pertaining to employees of an organization, personal information pertaining to customers of the organization, information pertaining to business processes of the organization, and information pertaining to intellectual property of the organization.

* * * * *